(12) United States Patent
Brandt et al.

(10) Patent No.: US 8,827,473 B2
(45) Date of Patent: Sep. 9, 2014

(54) VEHICLE HAVING AT LEAST ONE INSTRUMENT IN A DRIVER INFORMATION SYSTEM AND A METHOD FOR AVOIDING REFLECTIONS OF AN INSTRUMENT IN A WINDSHIELD OF A VEHICLE

(75) Inventors: Peter Brandt, Aschaffenburg (DE); Heiko Charle, Ruesselsheim (DE); Georg Bauer, Bergen-Enkheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

(21) Appl. No.: 13/334,677

(22) Filed: Dec. 22, 2011

(65) Prior Publication Data
US 2012/0162961 A1 Jun. 28, 2012

(30) Foreign Application Priority Data
Dec. 24, 2010 (DE) .......................... 10 2010 056 250

(51) Int. Cl.
| | |
|---|---|
| *F21V 9/14* | (2006.01) |
| *G01K 1/06* | (2006.01) |
| *G09F 13/04* | (2006.01) |
| *G09F 13/08* | (2006.01) |
| *G02B 5/30* | (2006.01) |
| *G02B 27/28* | (2006.01) |
| *B60J 3/06* | (2006.01) |

(52) U.S. Cl.
CPC ................ *B60J 3/06* (2013.01); *G02B 5/3066* (2013.01); *G02B 27/28* (2013.01); *G02B 5/3033* (2013.01)
USPC ......... 362/19; 362/23.01; 362/97.1; 362/97.3

(58) Field of Classification Search
USPC ............ 362/19, 23.01, 97.01, 600, 97.1, 97.3
See application file for complete search history.

(56) References Cited

U.S. PATENT DOCUMENTS

| | | |
|---|---|---|
| 3,679,887 A | 7/1972 | Kennedy |
| 4,311,365 A | 1/1982 | Tsuda et al. |
| 4,418,377 A | 11/1983 | Tamura |
| 5,053,755 A | 10/1991 | Smith et al. |

(Continued)

FOREIGN PATENT DOCUMENTS

| | | |
|---|---|---|
| DE | 2143307 A1 | 5/1972 |
| DE | 2353485 A1 | 5/1975 |

(Continued)

OTHER PUBLICATIONS

Machine translation of Finster et al, DE-19702957, published Aug. 20, 1998.*

(Continued)

*Primary Examiner* — Ismael Negron
*Assistant Examiner* — William N Harris
(74) *Attorney, Agent, or Firm* — Ingrassia Fisher & Lorenz, P.C.

(57) ABSTRACT

A driver information system is provided for a vehicle having at least one instrument, which has a front plate and an illumination device. At least one light-transmitting area is arranged in the front plate and the illumination device is arranged behind the front plate, the illumination device being able to emit light through the at least one light-transmitting area of the front plate. A polarization filter is arranged between the front plate and the illumination device. The polarization filter is oriented opposite to a polarization direction of a windshield of the vehicle.

13 Claims, 7 Drawing Sheets

(56) References Cited

U.S. PATENT DOCUMENTS

| | | | |
|---|---|---|---|
| 5,566,025 | A | 10/1996 | Knoll et al. |
| 5,657,161 | A | 8/1997 | Melograne |
| 7,345,718 | B2 * | 3/2008 | Harada et al. .................. 349/96 |
| 7,661,859 | B2 * | 2/2010 | Nakagawa .................... 362/489 |
| 7,780,304 | B2 * | 8/2010 | Birman ........................... 362/19 |
| 2007/0217010 | A1 * | 9/2007 | Lippey .......................... 359/493 |
| 2008/0158852 | A1 * | 7/2008 | Fukushima et al. ............ 362/19 |
| 2009/0037055 | A1 | 2/2009 | Danner et al. |

FOREIGN PATENT DOCUMENTS

| | | | |
|---|---|---|---|
| DE | 2929817 | A1 | 2/1980 |
| DE | 3225362 | C1 | 1/1984 |
| DE | 19702957 | A1 | 8/1998 |
| DE | 19729855 | A1 | 1/1999 |
| DE | 19822422 | A1 | 11/1999 |
| DE | 19942193 | A1 | 3/2001 |
| DE | 10239828 | A1 | 3/2003 |
| DE | 202006003568 | U1 | 7/2006 |
| DE | 102005051965 | A1 | 5/2007 |
| DE | 102006019870 | A1 | 11/2007 |
| WO | 2010089026 | A1 | 8/2010 |

OTHER PUBLICATIONS

Machine translation of Volz, DE-2353485, published May 7, 1975.*
UK IPO, British Search Report for Application No. 1121102.6, dated Apr. 10, 2012.

* cited by examiner

VEHICLE HAVING AT LEAST ONE INSTRUMENT IN A DRIVER INFORMATION SYSTEM AND A METHOD FOR AVOIDING REFLECTIONS OF AN INSTRUMENT IN A WINDSHIELD OF A VEHICLE

CROSS-REFERENCE TO RELATED APPLICATION

This application claims priority to German Patent Application No. 102010056250.5, filed Dec. 24, 2010, which is incorporated herein by reference in its entirety

TECHNICAL FIELD

The technical field relates to a vehicle having at least one instrument in a driver information system.

BACKGROUND

Like an audio device, a driver information system typically has multiple illuminated displays. In particular, in darkness, these illuminated displays may reflect in the windshield. These reflections are undesirable, since they may obstruct the view of the driver, which could result in a hazard to the street traffic in particular when driving in darkness. A motor vehicle with display device is known from the publication DE 10 2005 051 965 A1. In this display device, a background illumination has an extensive optical fiber body arranged on the rear side of the display screen, into which the illuminants couple light. For this purpose, the side of the optical fiber body facing toward the rear side of the display screen has a microstructure, which is oriented in such a manner that light provided for the background illumination of the display does not have any component in the direction of the windshield of the motor vehicle. In order to achieve this, a complex angled structure is arranged on the top side of the extensive optical fiber body, which is connected with high manufacturing costs, in particular because this prism-like microstructure must have exact reflection angles, so as not to emit any component of the light in the direction toward the windshield.

In addition, the rear side of the optical fiber body must also either be arranged at an acute angle to a reflector of the display device or the reflector must be structured corresponding to a Fresnel film. These structural measures of an extensive optical fiber body both on its front side and also of the reflector on its rear side cause substantial tool costs of the optical fiber or the reflector and increase the overall costs of this display device.

Therefore, at least one object is to provide a simple and cost-effective possibility for suppressing reflections of an illuminated display of a driver information system on the windshield. In addition, other objects, desirable features, and characteristics will become apparent from the subsequent summary and detailed description, and the appended claims, taken in conjunction with the accompanying drawings and this background.

SUMMARY

A vehicle is provided having a driver information system. The driver information system having at least one instrument. The instrument has a front plate and an illumination device, at least one light-transmitting area being arranged in the front plate. The illumination device is arranged behind the front plate and can therefore emit light through the light-transmitting area of the front plate. A polarization filter is arranged between the front plate and the illumination device, which has a polarization direction that is oriented opposite to a polarization direction of a windshield of the vehicle.

A reflection of the light-transmitting areas of the instrument through which light shines can thus be prevented by a suitable relationship between the polarization direction of the light emission and the polarization direction of the windshield, so that at least a reduced reflection occurs. The undesired reflection in the windshield of areas of an instrument of the driver information system through which light shines can thus be provided by a suitable polarization direction of the polarized light emission of the operating elements. For example, reflections of areas through which light shines, such as operating elements of an instrument, can be avoided if the polarization filter is arranged behind the front plate having the operating elements. For example, the driver information system can be implemented as a dashboard and the instrument can be implemented as a communication device, input device, playback device, measuring device, or audio device.

In one embodiment, the light emitted by the areas of the front plate of the instrument through which light shines is linearly polarized, so that a linearly polarizing filter can be rotated in front of the illumination device until reflections on a multilayer windshield are suppressed as substantially as possible.

In a further embodiment, it is provided that light emitted from the areas through which light shines is circularly polarized, so that a circularly polarizing filter can be rotated in front of the illumination device until reflections on a multilayer windshield are suppressed as much as possible. It is decisive that both polarization methods are advantageously oriented optimally in relation to the orientation of linearly or circularly polarizing filters in relation to a vehicle windshield.

Applying non-reflective films to the inner sides of side windows and/or even windshields can therefore be omitted. The instrument described herein advantageously utilizes the linearly or circularly polarizing properties of windshields, and a polarization direction of a polarization filter in front of the illumination device is arranged rotated inside the instrument in relation to the polarization direction of the linearly or circularly polarizing properties of the windshield in such a manner that a desired suppression of the reflection of the areas through which light shines is achieved.

In one embodiment, the polarization direction of the polarized light display is oriented opposite to the polarization direction of a windshield of the vehicle. In the case of linear polarization, the polarization directions can thus be rotated by approximately 90° to one another and therefore any mirror image on the windshield is extinguished. In the case of circular polarization, a rotational direction reversal can occur upon the reflection on a multilayer windshield, attenuation up to complete cancellation of the reflection being able to occur depending on the intensity of the light reflected with rotational direction reversal.

In the case of linear polarization, only the polarization filter for the light-transmitting areas, which is newly integrated into the instrument, must form a polarized light display, which is rotated by approximately 90° in relation to the polarization direction of the linear polarization of the windshield. If a polarization filter does not meet this requirement from the beginning, an extinguishing angle can advantageously be detected by a polarization measurement filter, using which the angle difference is ascertained to correct the orientation of the polarization filter.

In the case of such a correction of the polarization directions, it is to be considered that both the driver and the passenger are not restricted in the visibility of areas through which light shines. In addition, it is necessary for the visibility when using polarized sunglasses to unrestrictedly possible through the correction of the linear polarization direction of the polarization filter. Corresponding experiments have shown that an optimization between these three requirements, firstly suppression of reflections in the windshield, secondly visibility for driver and passenger, and thirdly recognizability of the linearly polarized light emission of the areas even using polarized sunglasses, can be successfully achieved.

The illumination device can be installed on a circuit board. This has the advantage of simple activation and deactivation of the illumination device via the preinstalled components of the circuit board. The polarization filter integrated in the instrument can be a transparent plastic film having linearly or circularly oriented molecular chains. Such a polarization filter is arranged appropriately oriented in front of the illumination device, which can have a background illumination, whose light source is arranged on side edges of the circuit board, and reflectors on the circuit board being irradiated by the edge-side light source. The light is thus advantageously deflected in the direction of the light-transmitting areas of the front plate and through the polarization filter.

In a further embodiment, it is provided that the illumination device has a plurality of light-emitting diodes distributed on the circuit board. The distribution and number of the light-emitting diodes on the circuit board corresponds to the distribution and number of the light-transmitting areas of the front plate. An individual illumination, and its brightness, of each operating element and each display surface of the front plate, for example, can therefore be set.

In one embodiment, the front plate has operating elements, which can have light of the illumination device shine through them. These operating elements can be knobs, buttons, or dials, for example. The light-transmitting areas can be arranged in the operating element itself and/or on the edge of the operating element, in order to light through and/or illuminate the knob.

In a further exemplary embodiment, the instrument also has a pressure-sensitive mat, which is arranged behind the front plate. In this exemplary embodiment, the pressure-sensitive mat is arranged between the front plate and the polarization filter. The instrument can be an input device, a playback device, a measuring device, or an audio device.

A method for avoiding reflections from an illuminated instrument of a driver information system in a windshield of a vehicle is also specified. A vehicle is provided having a windshield and a driver information system having at least one instrument. The instrument has, arranged one behind another, a front plate having at least one light-transparent area and an illumination device. An extinguishing angle is ascertained by rotating a polarization direction of a polarization filter in front of the front plate having light-transmitting areas, through which light shines, until the reflection of the at least one unpolarized light-transmitting area is extinguished on the windshield. A polarization filter is adapted and installed in the instrument at the ascertained extinguishing angle between the front plate and the illumination device.

After such an extinguishing angle is ascertained, it applies to an entire series of vehicles or to a special vehicle type, so that the extinguishing angle and therefore the manufacturing of instruments are advantageously not to be adapted individually for each individual vehicle, but rather the entire series of the vehicle type can be equipped with the appropriately adapted instrument.

The ascertainment of the extinction angle is performed by means of a linearly or circularly polarized polarization measurement filter, which is rotated in relation to the unpolarized light emission of the light-transmitting areas until the rotated polarization direction of the polarization measurement filter is opposite to the polarization direction of the linearly or circularly polarized mirror image on the windshield and therefore the mirror image is attenuated or disappears entirely.

The extinguishing angle can be ascertained in consideration of the visibility of the polarized light emission of the light-transmitting operating elements to the driver and passenger. Furthermore, it is possible to ascertain the extinguishing angle in consideration of the visibility of the polarized light emission of the operating elements to the driver having polarized sunglasses.

BRIEF DESCRIPTION OF THE DRAWINGS

The present invention will hereinafter be described in conjunction with the following drawing figures, wherein like numerals denote like elements and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
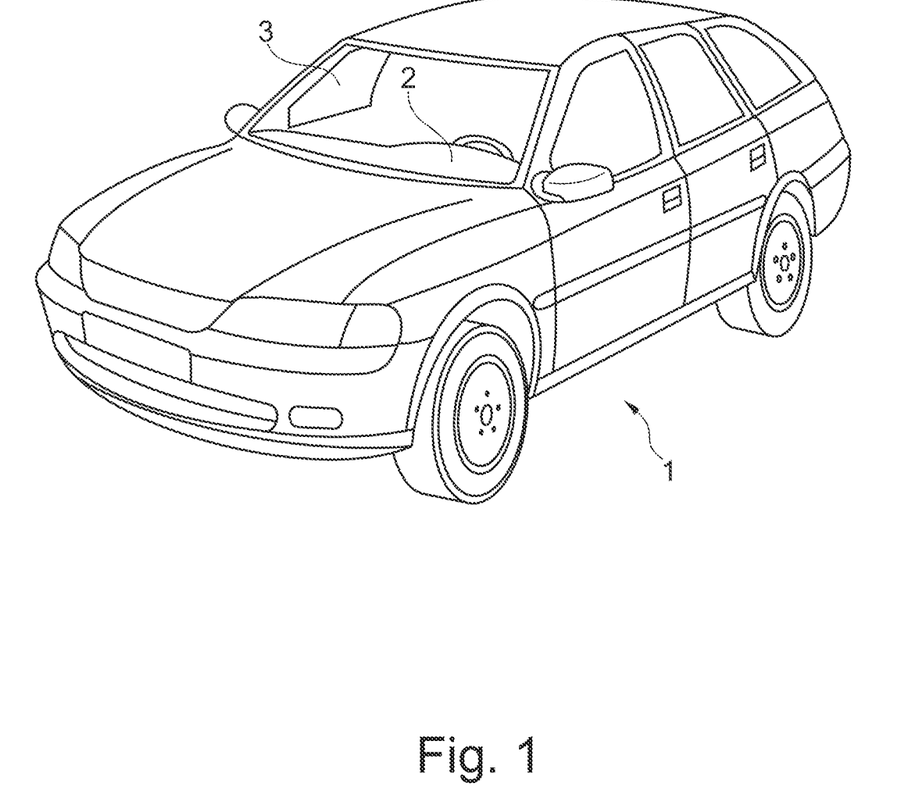
FIG. 1 shows a schematic view of a vehicle.

FIG. 1 shows an example of a vehicle 1 having a driver information system 2 and a windshield 3. An instrument is arranged in the driver information system 2, whose polarized light emissions of operating elements and display surfaces can no longer reflect in the linearly polarizing windshield 3.

Figure 2:
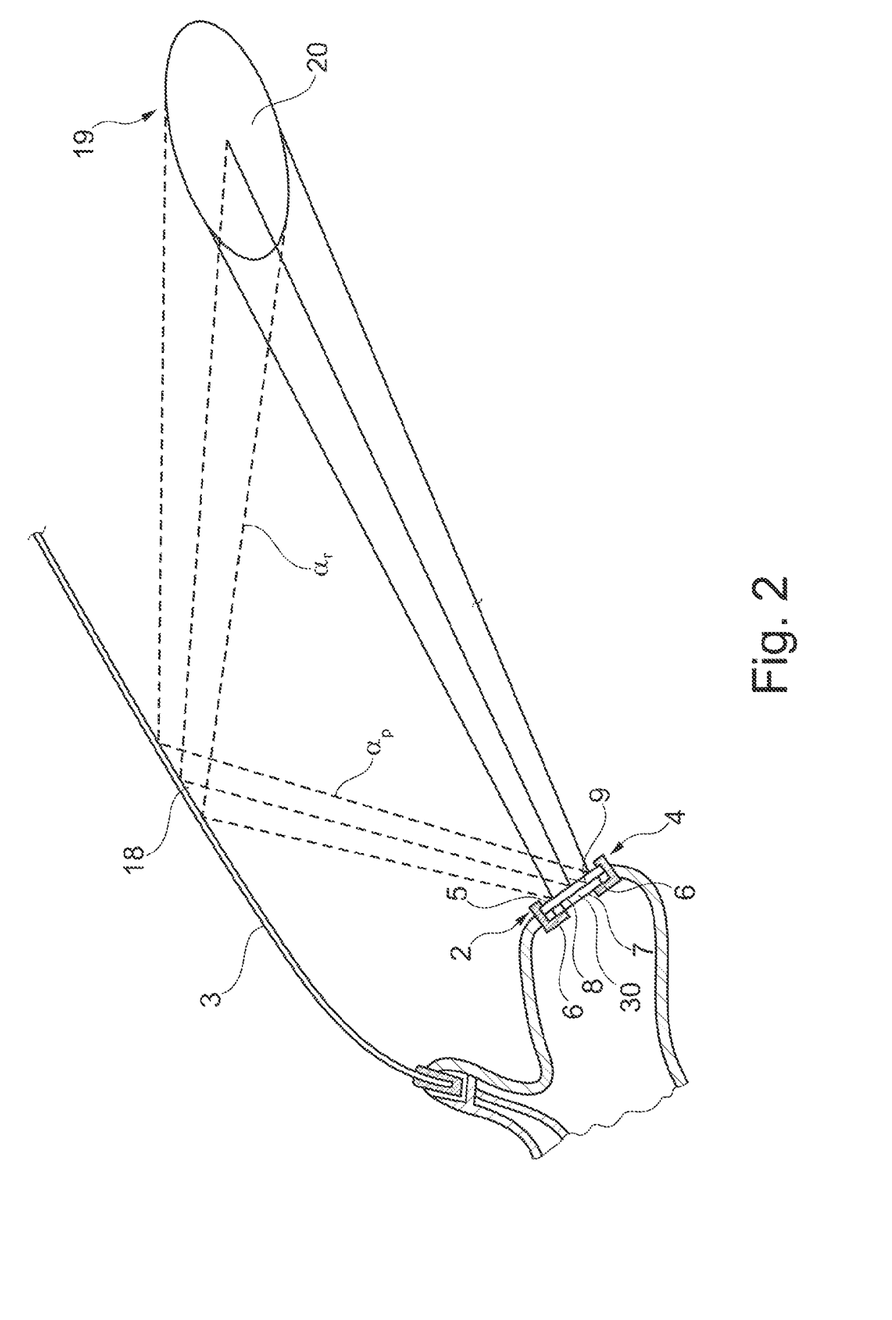
FIG. 2 shows a part of the vehicle shown in FIG. 1 having driver information system and instrument.

FIG. 2 shows a part of the vehicle 1 shown in FIG. 1 having a cross-section through the driver information system 2, the instrument 4, and the windshield 3. The instrument 4 is implemented in the exemplary embodiment shown as a communication playback device. The driver information system 2 is a dashboard in the exemplary embodiment shown, which does not have an optical screen in the direction toward the windshield 3, so that a mirror image 18 of illuminated operating elements 8 can be projected on the windshield 3 in particular when traveling at night, which could irritate vehicle occupants 19, of which an ellipse 20 is symbolically shown here.

In order to avoid this, the polarization direction $\alpha_P$ of a polarized light emission 9 is oriented opposite to a polarization direction $\alpha_R$ of the windshield 3 of the vehicle, in that a polarization filter is integrated in the instrument 4, which is rotated opposite to the orientation of the polarization direction $\alpha_R$ of the windshield 3 in such a manner that the annoying reflections on the linearly polarizing windshield 3 are suppressed at least for the driver.

During the setting of the optimum reflection-free polarization direction $\alpha_P$ of the polarized light emission 9 in relation to the polarization direction $\alpha_R$ of the windshield 3, however, it is taken into consideration that the polarized light emission 9 is still clearly recognized through sunglasses having vertically polarizing sunglasses lenses, and both driver and also a passenger can still recognize the polarized light emission 9. For this purpose, following FIG. 3 to FIG. 6 show the fundamental requirements of this antireflection treatment of the windshield 3.

Figure 3:
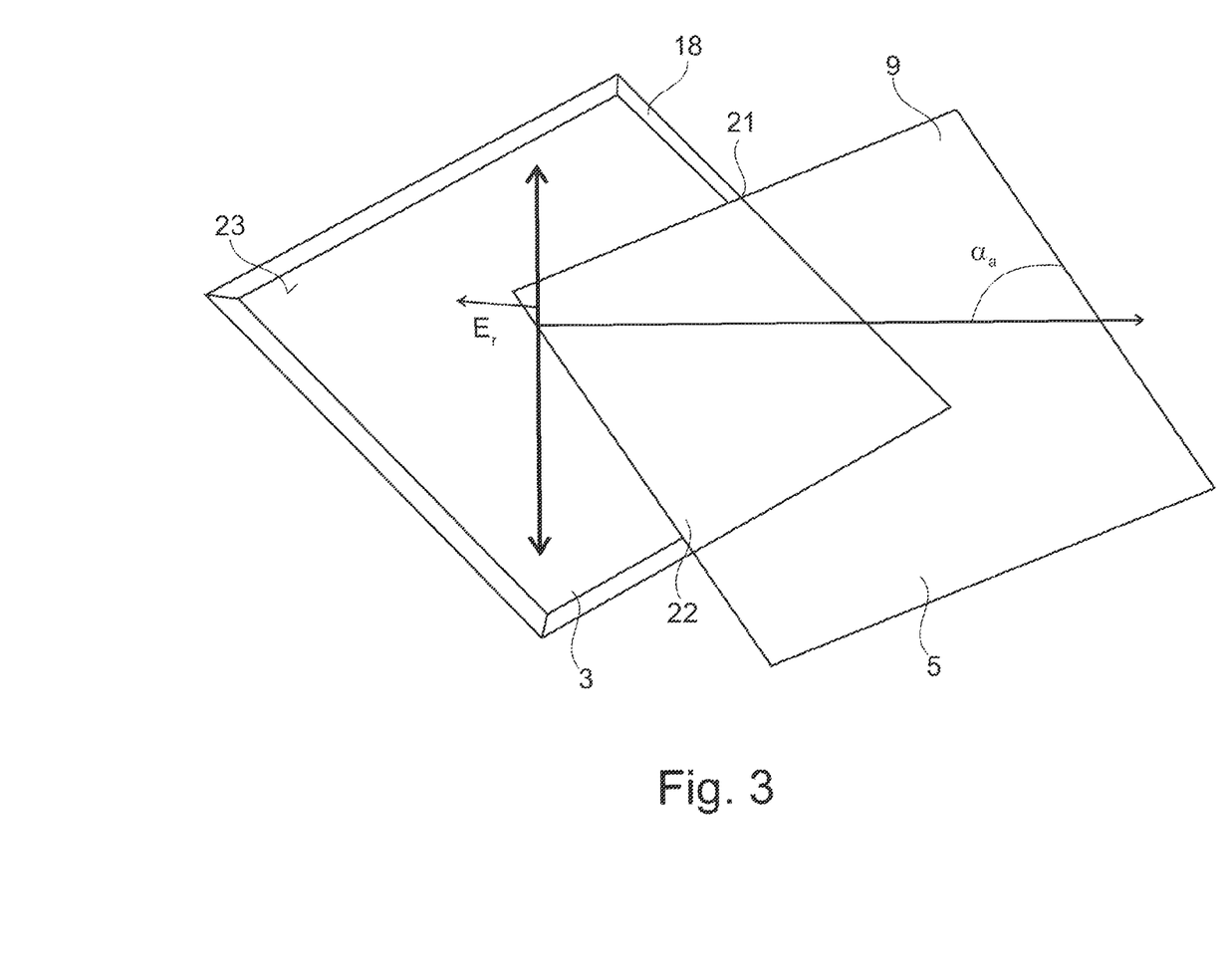
FIG. 3 shows a schematic outline of the superposition of a polarized light emission of operating elements or display surfaces of the instrument and the polarized light of the windshield.
Figure 4:
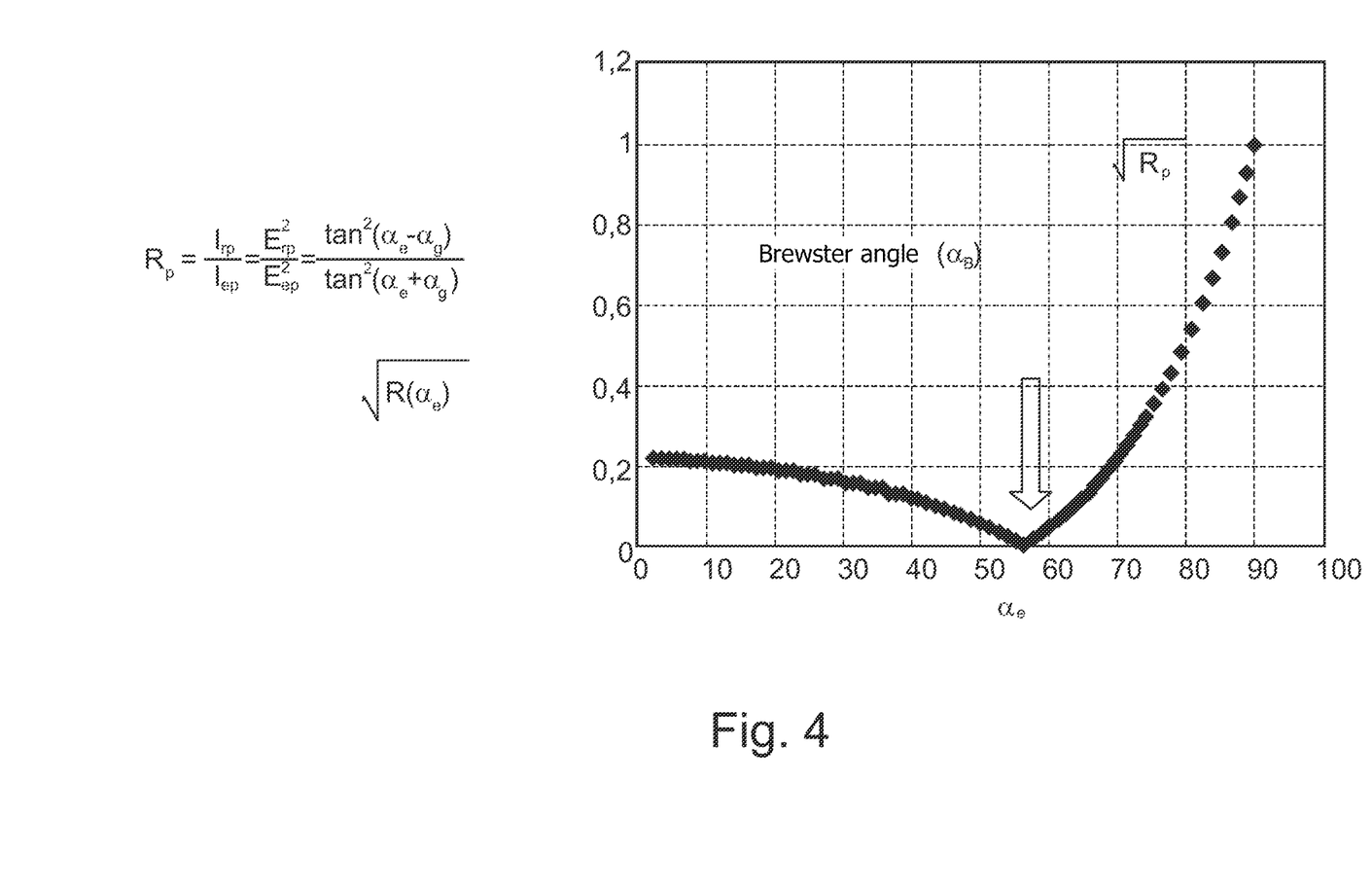
FIG. 4 shows the Fresnel formula for a linear polarization and reflection on a glass surface and a graph of the dependence of the reflection on the angle of incidence.

FIG. 3 shows a schematic outline of the superposition of the polarized light emission of the operating element and the linearly polarized light of the windshield 3, the intensity $E_R$ of the reflection being given by a Fresnel formula shown in FIG. 4 and the intensity $E_R$ being a function of an angle of incidence on the windshield 3. The polarization direction $\alpha_R$, as shown in FIG. 3, is given by the direction of extension of a polarization film having long-chain molecules, the light effects being extinguished in the area of a superposition 21 of the polarization direction of the polarized light emissions with the polarization direction of the mirror image on the windshield 3, which is shown here by a black non-illuminated surface 22.

FIG. 4 shows the Fresnel formula for a linear polarization in the case of reflection on a glass surface having a graph of the dependence of the reflections $R_E$ on an angle of incidence $\alpha_E$. This diagram shows that at a so-called Brewster angle ($\alpha_B$), the reflection of a glass surface goes toward zero in the case of an angle of incidence of approximately 57°, i.e., the light that is emitted at a Brewster angle onto a glass surface is completely absorbed and no longer reflected by the glass. However, this would mean that the operating elements of an instrument are to be oriented at a fixed angle such as the Brewster angle in relation to the windshield, in order to prevent a mirror image or a reflection of the operating elements on the windshield. For this purpose, either the display screen or the windshield would correspondingly be oriented according to the Brewster angle, which is not the foundation of this application, however. Rather, the next figure, FIG. 5, shows the foundation of this application.

Figure 5:
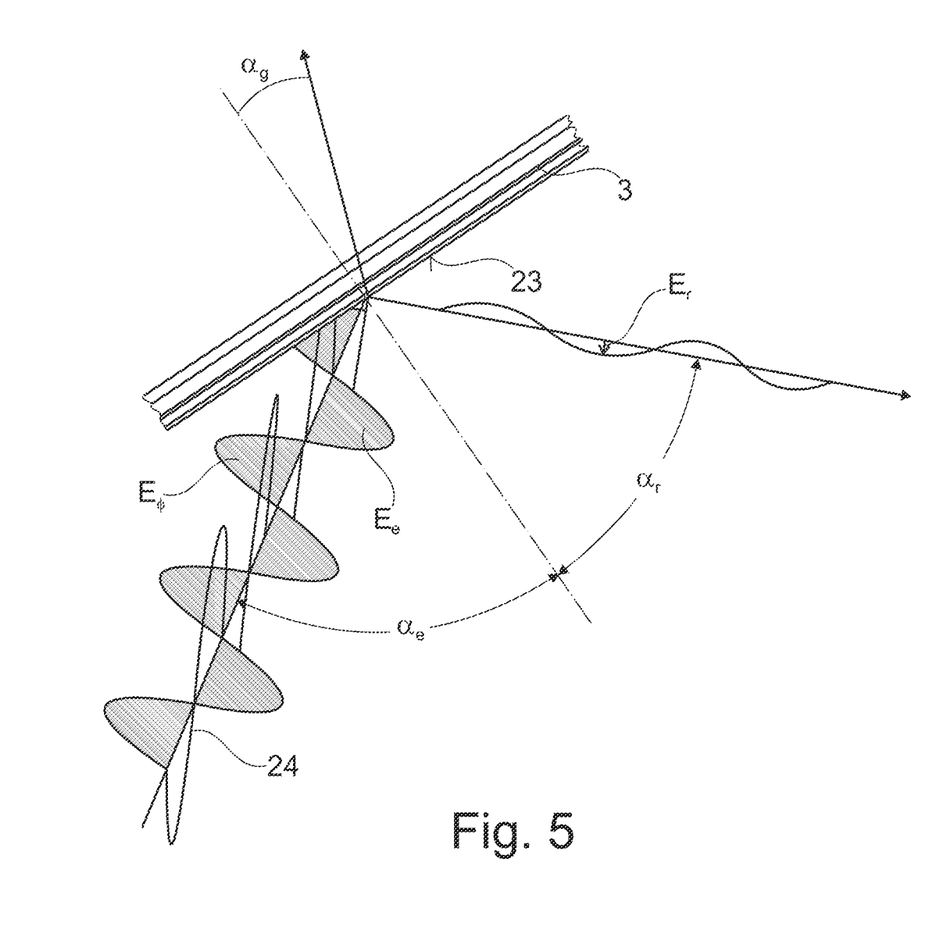
FIG. 5 shows the polarization by reflection on a glass surface.

FIG. 5 shows the polarization by reflection on the glass surface of a windshield 3. The component oriented parallel to the surface 23 of the windshield 3, having the intensity $E_{\phi p}$, is completely absorbed by the reflection surface. The intensity $E_R$ of the reflected light is therefore zero if the light angle of incidence $\alpha_e$ is equal to the Brewster angle of approximately 57.3°. An arbitrary illumination beam 24, which is an incident at an angle of incidence $\alpha_E$ on the surface 23 of the windshield 3, is linearly polarized and emitted at a reflection angle $\alpha_R$ having a reduced intensity $E_R$. However, in contrast, if already polarized light is oriented onto the surface 23 of the windshield 3, through the linear polarization of the windshield 3, with suitable orientation of the polarization of the polarized light display, the mirror image is attenuated by superposition of the two polarization directions, and even completely extinguished at approximately 90° between the polarization directions.

Figure 6:
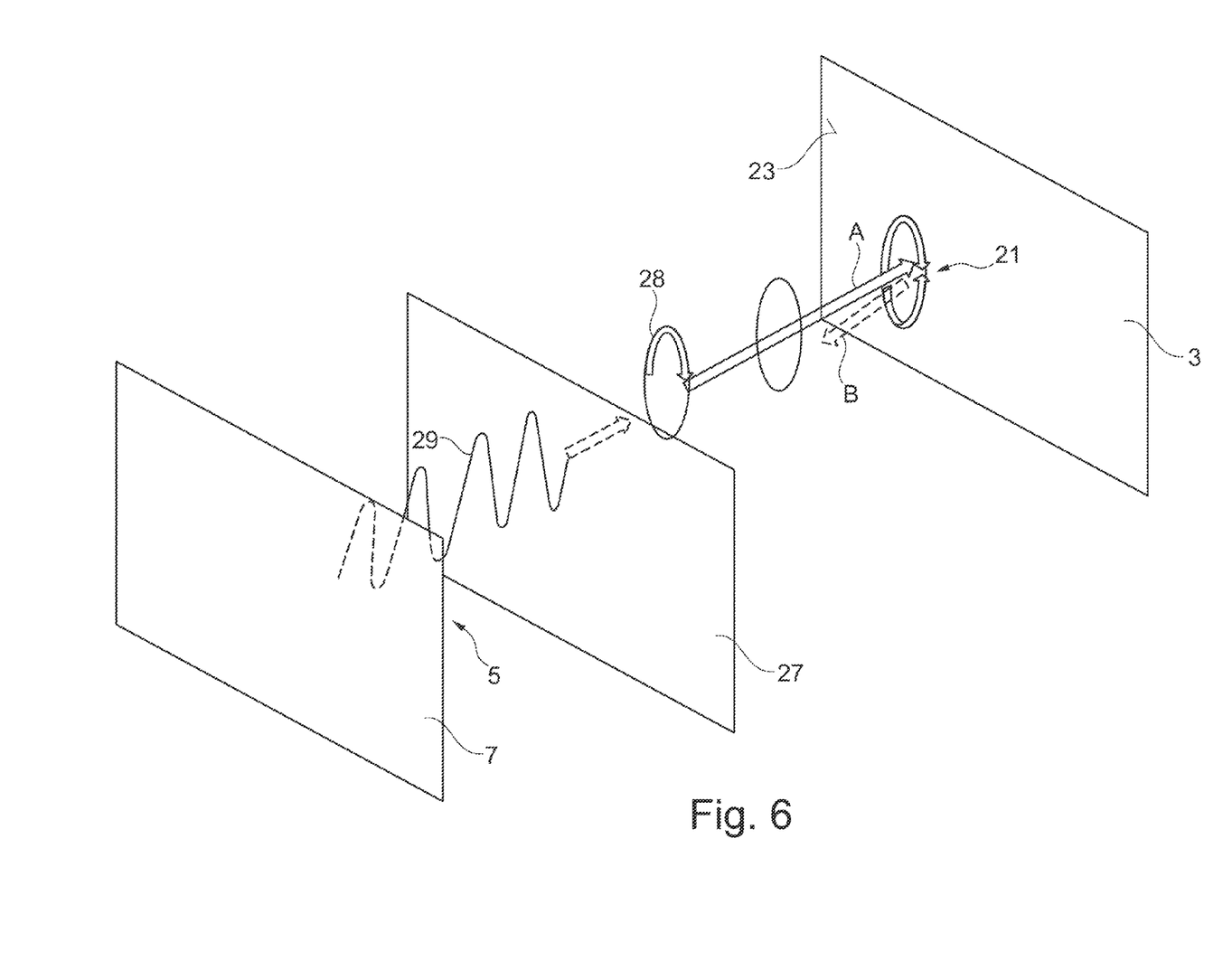
FIG. 6 shows a schematic outline of circularly polarized light of a polarizing film and the interaction with a windshield.

FIG. 6 shows a schematic outline of an illumination device, which shines through a circularly polarized intermediate film 27, and the interaction with a windshield 3. For this purpose, the circularly polarized intermediate film 27 is irradiated with linearly polarized light 29 from an illumination source 5 via a polarization filter 7.

Circularly polarized light 28, which is incident in the arrow direction A on the windshield 3, is reflected with reversal of the circulation on the windshield 3 in the arrow direction B and interferes with the incident circularly polarized light 28, so that with suitable rotation of the circularly polarized intermediate film 27, superposition 21 and extinguishing of the reflection of the images of operating elements of the front plate on the windshield 3 is possible, without additional measures, such as antireflection layers, being required on the windshield 3.

Figure 7:
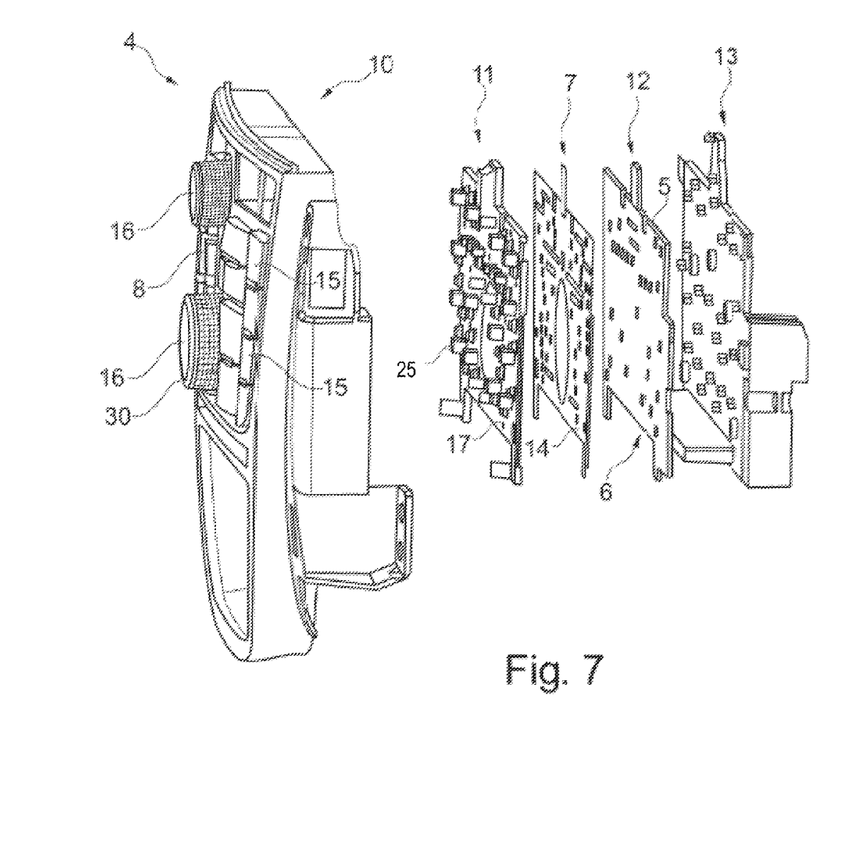
FIG. 7 shows a schematic outline of a communication playback device having integrated polarization film to reduce reflections on a windshield of the vehicle shown in FIG. 1.

FIG. 7 shows a perspective exploded schematic outline of an instrument 4 having integrated polarization filter 7 in the form of a polarization film 14 for reducing reflections on a windshield of the vehicle 1 shown in FIG. 1. The instrument 4 is a communication playback device and is arranged in a driver information system of the vehicle 1. The instrument 4 has a front plate 10. Operating elements 8 in the form of push switches 15, rocker switches, sliding switches, and/or rotating knobs 16 and display surfaces are arranged in the front plate 10, the operating elements 8 cooperating with a pressure-sensitive mat 11 arranged behind the front plate 10. The front plate 10 also has light-transmitting areas 30, which are arranged in and on the edge of the operating elements 8, in order to be able to shine light from an illumination direction 6 of the instrument 4 through them.

The pressure-sensitive mat 11 has switch pins 25, which protrude from a rubber-elastic semitransparent mat 17, and which cooperate with the operating elements 8. Furthermore, the pressure-sensitive mat 11 has openings, through which light can fall on the light-transmitting areas 30 of the operating elements 8 and display surfaces of the front plate 10. A polarization filter 7 made of a polarization film 14 is arranged behind the pressure-sensitive mat 11. The illumination source 5 is arranged on a circuit board 12 behind the polarization filter 7.

The circuit board 12 has a plurality of light-emitting diodes, which form an illumination source 5. The number and the distribution of the light-emitting diodes correspond to the number and the distribution of the light-transmitting areas 30 on the front plate 10. The polarization direction of the polarization film 14 is oriented opposite to a polarization direction of the polarizing windshield, so that the polarizing light emission of the light-transmitting areas 30 of the operating elements 8 and the display surfaces of the instrument 4 is no longer reflected in the windshield.

A rear wall 13 of the instrument 4 is arranged behind the circuit board 12 and forms an instrument housing with the front plate 10. The polarization filter 7 is therefore arranged inside the instrument housing, so that an antireflection film on the outer side of the front plate 10 can be omitted.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:
1. A driver information system for a vehicle with a windshield, comprising:

an instrument having a front plate that includes a light transmitting area;

a pressure-sensitive mat arranged behind the front plate and having a closed opening that corresponds to the light-transmitting area of the front plate;

an illumination device arranged behind the front plate and the pressure-sensitive mat and configured to emit light through the opening and the light-transmitting area of the front plate; and a polarization filter arranged between the pressure-sensitive mat and the illumination device and oriented opposite to a polarization direction of the windshield of the vehicle.

2. The vehicle according to claim 1, wherein the polarization filter is a transparent plastic film comprising linearly oriented molecular chains.

3. The vehicle according to claim 1, wherein the polarization filter is a transparent plastic film having circularly oriented molecular chains.

4. The vehicle according to claim 1, wherein the illumination device is installed on a circuit board.

5. The vehicle according to claim 4, wherein the illumination device comprises background illumination with a light source arranged on side edges of the circuit board.

6. The vehicle according to claim 5, wherein the illumination device comprises a plurality of light-emitting diodes distributed behind the front plate.

7. The vehicle according to claim 6, wherein a distribution and number of the plurality of light-emitting diodes on the circuit board corresponds to a second distribution and number of light-transmitting areas of the front plate.

8. The vehicle according to claim 1, wherein the polarization direction of a polarized light emission through the light-transmitting area of the front plate is oriented opposite to the polarization direction of the windshield of the vehicle.

9. The vehicle according to claim 1, wherein the front plate comprises operating elements through which light of the illumination device is configured to shine.

10. The vehicle according to claim 1, wherein the instrument is an input device.

11. The vehicle according to claim 1, wherein the instrument is a playback device.

12. The vehicle according to claim 1, wherein the instrument is a measuring device.

13. The vehicle according to claim 1, wherein the instrument is an audio device.

* * * * *